United States Patent [19]
Burk et al.

[11] 3,809,059
[45] May 7, 1974

[54] COOLANT HEATED OVEN FOR USE WITH VEHICLE ENGINES

[76] Inventors: Robert L. Burk, 417 S. Lucerne Blvd.; Jack G. Hotchkiss, 418 S. Arden Blvd., both of Los Angeles, Calif. 90020

[22] Filed: Nov. 17, 1972

[21] Appl. No.: 307,381

[52] U.S. Cl. .............................. 126/19.5
[51] Int. Cl. ............................... F24b 1/00
[58] Field of Search .......... 126/19, 19.5; 237/12.3 B

[56] References Cited
UNITED STATES PATENTS

| | | | |
|---|---|---|---|
| 2,319,422 | 5/1943 | Maihack | 126/19.5 |
| 3,590,802 | 7/1971 | Fried | 126/19.5 |
| 2,038,193 | 4/1936 | Parsons | 126/19.5 X |
| 3,013,548 | 12/1961 | Thomas | 126/19.5 |
| 2,661,015 | 12/1953 | Allred et al | 126/19.5 X |

*Primary Examiner*—Edward G. Favors
*Attorney, Agent, or Firm*—William H. Maxwell

[57] ABSTRACT

A moderate heat oven for use in vehicles and safely operated by the passage of engine coolant therethrough and adapted to bring foods to and to maintain food at serving temperature. The oven is a unit separable from the engine to which it is connected by quick detachable couplers and is thereby made portable, and is insulated for retaining a heated condition; all to the end that normal internal combustion engine operation in the 175°–180° F. coolant heat range maintains a "ready to serve" oven temperature of approximately 170° F. and which is retained at a slow rate of temperature drop.

3 Claims, 6 Drawing Figures

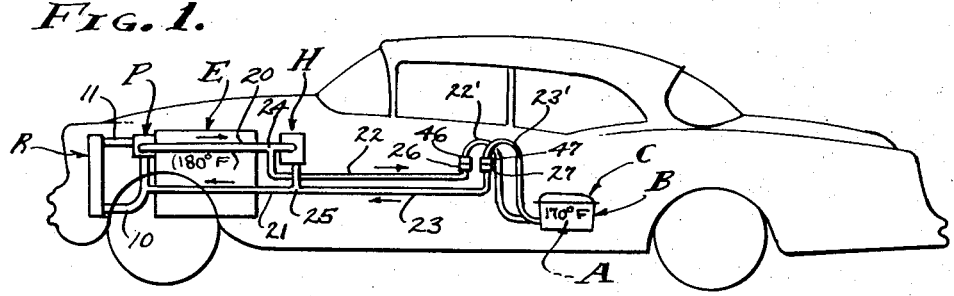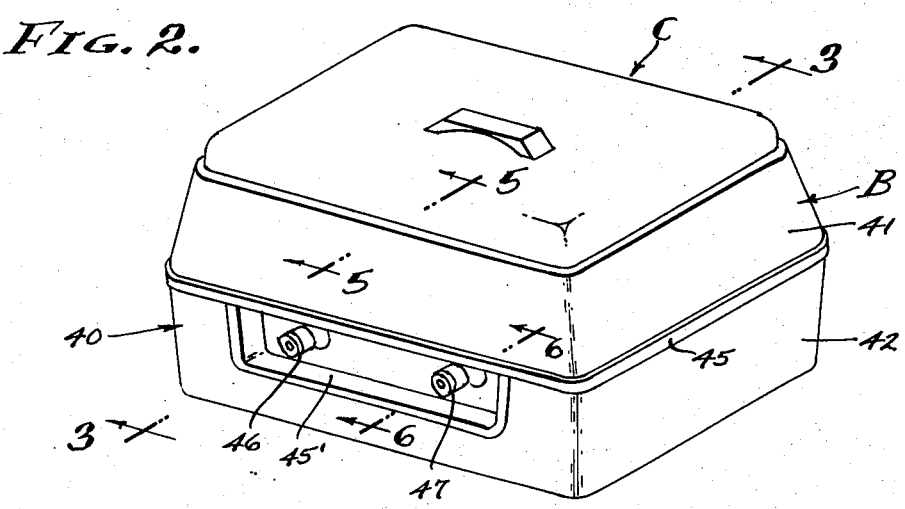

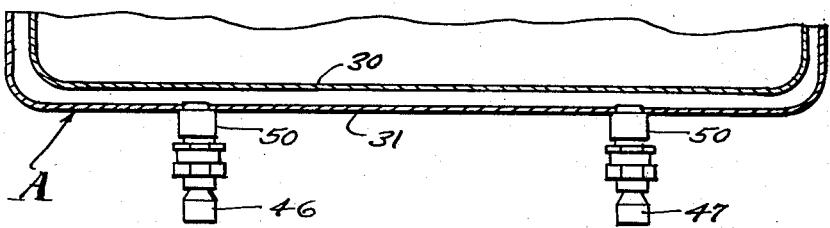
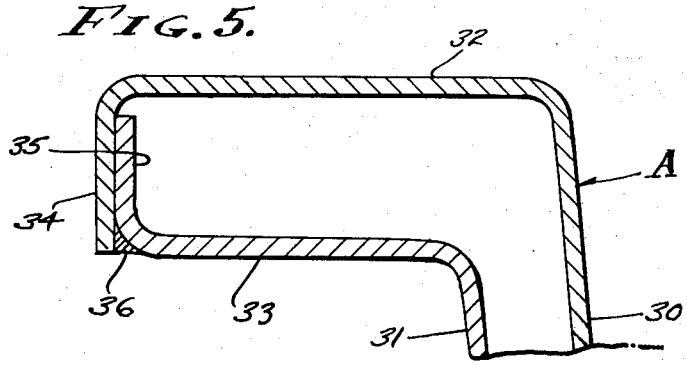
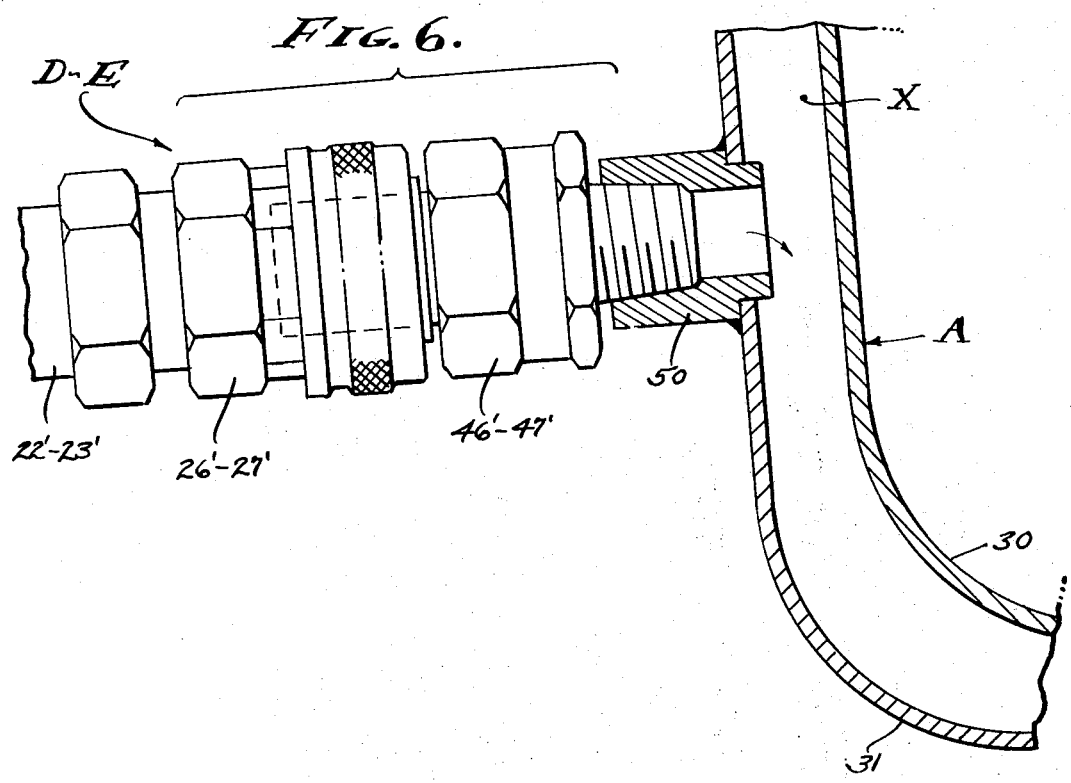

3,809,059

COOLANT HEATED OVEN FOR USE WITH VEHICLE ENGINES

BACKGROUND

The most widely used mode of travel is the automobile and the like which employs the internal combustion engine as a prime mover, and most of all which are liquid cooled. As a result of this mode of travel and because of the distance and time involved, rest and picnic areas are established along highways, as well as commercial eating places. However, the frequency and exact location of such areas and places is not always determinable and their location cannot always be relied upon. Further, the facilities available at such areas are not always adequate, or the eating in commercial establishments may not be desired. Also on the other hand, there are other reasons to transport ready to serve food, such as food samples to be presented to prospective customers by salesmen. In any case, there are numerous reasons, private or commercial, for the transport of foods in direct connection with automotive travel, and heretofore there has been no way to heat to and to maintain foods at a "ready to serve" temperature during lengthy transport via automobile and the like. Therefore, it is an object of this invention to provide an oven for heating foods to and for maintaining foods at "ready to serve" temperature during travel via vehicle and operated by a portion of the waste heat derived from internal combustion engine operation. With the present invention, the engine coolant is the medium of heat exchange that operates the oven.

The normal operating temperature of automotive prime movers in the form of internal combustion engines, such as the Otto Cycle gasoline engines is in the range of 175° to 180° F. Such an engine is usually controlled by a thermostat which assures operation within said range of temperature and consequently the liquid coolant that is discharged therefrom and through the radiator is at or within said predetermined heat range.

The normal serving temperature for hot foods is 160° to 170° F., this being the moderate temperature which enhances properly prepared foods in their ready to serve condition.

Referring now to the two aforementioned temperatures, that of an engine and that of ready to serve foods, it is an object of this invention to advantageously employ the normal temperature drop that is unavoidably involved in transporting coolant to and from the oven. In practice, the temperature drop has been found to be 5° to 10° F. when using rubber (otherwise not insulated) hose leading to and from the oven unit placed in the passenger compartment of the vehicle. Rubber and the like is a poor heat conductor and thereby functions as an insulator to contain the coolant heat despite the lengthy runs of hose. In any case, the predicted coolant source temperature and predictable heat loss therefrom results in a predictable oven temperature, for example 165° to 175° F. dependent of course upon variation in engine operation and in the particulars of installation.

Portability and facility of connection are of prime importance and without which such an oven would be impractical, and therefore it is an object of this invention to provide an oven unit that is completely severable from the vehicle engine cooling system. With the present invention, quick detachable fluid couplers are employed in conjunction with hoses extended from the engine coolant circulating system, and which may be connected or disconnected with the assurance of coolant circulation and without adverse affect on the engine operation.

The coextensive application of heat throughout the vessel area of deep-drawn containers is not readily accomplished, it being an object of this invention to do so. With the present invention, manifolding as usually practiced and/or the use of baffles has become unnecessary, and in lieu thereof spaced mono-shells of deep-drawn container form are combined so as to provide a simple unbaffled chamber into which engine coolant is circulated for heat absorption and dissipation from the innermost wall. As shown, the inlet and outlet are spaced and disposed so as to create a substantially uniform discharge of heated liquid.

It is another object of this invention to provide a conveniently manipulatable oven unit that is safe to employ within the confines of the passenger compartment of a vehicle. The surrounding encasement is well insulated from the heated food containment elements, while the attainment of moderate heat in the 165–175° F. temperature range therein is well within and cannot exceed a danger point in the event of an accident or spillage thereof.

DRAWINGS

The various objects and features of this invention will be fully understood from the following detailed description of the typical preferred form and application thereof, throughout which description reference is made to the accompanying drawings, in which: –

FIG. 1 is a schematic view of a typical motor vehicle illustrating the coolant system thereof as it is combined with the oven.

FIG. 2 is a perspective view illustrating a typical embodiment of the oven.

FIG. 3 is an enlarged transverse sectional view taken as indicated by line 3—3 on FIG. 2.

FIG. 4 is a fragmentary sectional view taken as indicated by line 4—4 on FIG. 3.

FIG. 5 is an enlarged detailed fragmentary view taken as indicated by line 5—5 on FIG. 2 and showing the joinder at the upper rim of the oven liner.

And, FIG. 6 is an enlarged fragmentary view taken as indicated by line 6—6 on FIG. 2 and showing the fluid connections which enter the fluid section of the oven liner.

PREFERRED EMBODIMENT

A vehicle is shown with an engine E for its propulsion. As is clearly indicated, said engine is liquid cooled and involves the usual accessories which are directly associated therewith and necessary to its operation. Included as necessary accessories are the water pump P and radiator R joined thereto by inlet and outlet hoses 10 and 11. It is the water pump P that induces flow of coolant through the hoses 10 and 11 and into which the heater accessory hoses 20 and 21 are connected, respectively. It is to be understood, and as shown, that the water pump can be so constructed to have fittings which tap-off the optimum flow of coolant for heater operation. Thus, a heater H receives coolant through hose 20 and returns coolant through hose 21, these two hoses being subject to differential in pressure which assures constant flow providing that the circuit therethrough is open. Therefore and in accordance with this invention, we provide extensions 22 and 23 of the heater inlet and heater outlet hoses 20 and 21 respectively, these hose extensions being connected as by "T" fittings indicated at 24 and 25.

The hose extensions 22 and 23 can be routed through the vehicle as may be required, to enter the passenger compartment as shown, or to enter the trunk compartment if so desired. In any case and in accordance with the invention, we provide one compliment of a quick detachable coupler at the terminal end of each hose. In practice, the female components 26 and 27 are installed at the terminal end of said hose and are of a normally closed two way shut-off type so as to prevent loss of liquid at the disconnections even though but low pressure is involved. The hoses are preferably rubber for ease of routing, while the use of this material or the equivalent assures a determinable heat loss or temperature drop in the range of 5–10° F. in the usual installation. Thus, the engine coolant temperature of 175–180° F. is reduced to 165–175° F. at the inlet hose terminus.

Referring now to the oven X, we provide a dual mono-shell liner A encased in a housing B and closed by a cover C, and with quick detachable inlet and outlet coupler hoses D and E. The liner A is like a Thermos, in that it is a two walled container for keeping liquids and the like at almost their original temperature for several hours; but in accordance with the present invention also to establish the heat condition which is then to be maintained. To these ends therefore, the liner A is heat conductive and is encased within the housing B which is of heat insulating capability closed by the cover C also of heat insulating capability. Heat energy is applied to the heat conductive liner A by means of fluidics using as a thermal source the coolant of an operating internal combustion engine and the like.

The dual mono-shell liner A is primarily a vessel for the containment of foods and the like and is a heat conductive element as distinguished from the prior art nonconductive elements such as Thermos constructions used in the containment of foods. In practice, the inner shell at least is made of deep-drawn stainless steel, and for uniformity the outer shell is made in a like manner. As shown, the two shells are each self-sustaining structures joined integrally so as to establish a monocoque liner having spaced inner and outer walls 30 and 31, the inner wall at least being heat conductive. It is to be understood that the shape of the liner can vary, it being shown in the form of a tub having flat spaced bottom walls, flat spaced side walls, and flat spaced end walls joined by spaced laterally disposed top and bottom flanges 32 and 33. Said walls and flanges of the inner and outer element are integrally joined as shown. The flanges 32 and 33 are horizontally disposed and joined together so as to establish a closed chamber X between the walls 30 and 31, and in practice, the flanges are provided with overlapping perimeter lips 34 and 35 which are secured one to the other as by means of brazing at 36. Thus, the heat conductive capabilities of the inner wall 30 is adapted to absorb and to tranfer heat from a heated fluid within said chamber X.

The housing B and cover C are the insulating elements of the oven and into which the liner A is either inserted or encapsulated. That is, the liner A is inserted or encapsulated in the housing B to receive the cover C which is, of course, removeable. As shown, the liner A is encapsulated in the housing B by means of foamed plastic insulation 35 such as polyurethane, which completely occupies all space and interstices and which is contained within a manipulatable box element 40. The box element can vary in configuration and is preferably molded of upper and lower sections 41 and 42. The lower section 42 opens upwardly to receive the bottom of liner A with substantial clearance therearound, and the upper section opens both upwardly and downwardly to pass the body of liner A with the lowermost flange 33 supported by a downwardly and an inwardly turned rabbet or shelf 44. The housing sections are joined by a bead 45 and hold holes in opposite sides of the housing receive recessed handles 45' which are secured therein as shown. It will be apparent how the plastic insulation 35 fully occupies the housing surrounding the liner A and substantially eliminates heat transfer out of the liner wall 31.

The quick detachable inlet and outlet coupler hoses D and E are directly connected into the chamber X without manifolding and without baffling and/or partitioning. In accordance with this invention, the hoses D and E open into the front side of the outer wall 31 at spaced positions intermediate the liner bottom and the flange 33. The walls 30 and 31 are juxtapositioned and closely spaced while the space between the connections of hoses D and E and chamber X is substantial and many times greater than the juxtapositioning of said walls. Consequently, the induction and exhausting of heated coolant enters and exhausts in and from omni directions, thereby forcing heated coolant to flow in all directions surrounding the inlet, and as well to enter the exhaust from all directions. Therefore, but a small percentage of direct cross flow occurs and the greater portion of heated coolant is circulated throughout the chamber X before being exhausted. Less obvious is the absorption of heat through the body of liquid that is contained within the chamber X and which assures uniformly co-extensive heating through the inner wall 31 of the liner A. Thus, the heated coolant delivered by hose 22 is uniformly distributed throughout the liner A and the temperature thereof maintained at a norm with the assurance of subsequent recirculation of all coolant through return line 23.

The quick detachable female couplers 26–27 can be fixedly mounted in the location shown in FIG. 1 and extended by hose extensions 22' and 23' connected to the oven unit, or the female couplers 26' and 27' can be directly connected to the oven unit as shown in FIG. 6. In any case, normally closed male components 46 and 47 of the quick detachable coupling are provided at the free and flexibly moveable ends of the hose extensions 22' and 23', while male coupler components 46' and 47' are provided at the front side wall 31, at the spaced connection points hereinabove described, and in open communication with the chamber X through tubular fittings 50 in the form of nipples brazed into wall openings as shown. The two bases are interchangeably useable with either male coupler complement, respectively. Thus, it will be clear how the portable oven unit can be set into the vehicle and conveniently connected into the prime mover cooling system as circumstances require.

From the foregoing, it will be seen that we have provided a simple and safe moderate heat oven for use in automotive travel and the like. The housing provides for convenience in handling, while the quick detachable fluid fitting provide for the convenient disengageable connection with the engine cooling system. Versitility of installation is acquired by providing flexible coolant line extensions, and all to the end that the normal engine operating temperatures of the coolant therein is employed and with the temperature drop herein referred to resulting in establishing and maintaining optimum "ready to serve" temperature of the hot foods placed within said oven. The double walled monocoque container or liner heats the food uniformly, and by using self-operating quick detachable couplers fluids within the disconnected lines are automatically contained and virtually without any loss whatsoever.

Having described only a typical preferred form and application of our invention, we do not wish to be limited or restricted to the specific details herein set forth, but wish to reserve to ourselves any modifications or variations that may appear to those skilled in the art.

I claim:

1. The combination of a liquid cooled heat engine, a moderate heat oven for foods and the like, said liquid cooled heat engine including means circulating heated liquid coolant therefor into an inlet and an outlet at differential pressures and extended by means of separate hoses to normally closed quick detachable coupler components at their terminal ends respectively, said moderate heat oven including a dual mono-shell liner having an outer wall and an inner heat conductive wall with a fluid confining chamber therebetween, and inlet and outlet lines extending between said first mentioned inlet and outlet respectively and in open communication at spaced connections into the aforementioned chamber through normally closed quick detachable coupler components disengageably connected to the first mentioned quick detachable coupler components respectively, whereby waste heat from the heat engine is gainfully employed as a heat source absorbed and transferred through said inner heat conductive wall.

2. The engine-oven combination of claim 1 wherein the said inlet and outlet lines from said first mentioned inlet and outlet respectively are extended by means of separate hoses to the normally closed quick detachable coupler components at their terminal ends disengageably connected to the first mentioned quick detachable coupler components respectively.

3. The engine-oven combination of claim 1, wherein the said inlet and outlet lines from said first mentioned inlet and outlet respectively are extended by means of separate hoses to the normally closed quick detachable coupler components at their terminal ends disengageably connected to the first mentioned quick detachable coupler components respectively and are extended to normally closed quick detachable coupler components at their terminal ends respectively, and wherein the said spaced connections into the chamber between the said liner walls are normally closed by quick detachable coupler components disengageably connected to the last mentioned quick detachable coupler components respectively.

* * * * *